United States Patent
Juricak et al.

(10) Patent No.: US 9,435,104 B2
(45) Date of Patent: Sep. 6, 2016

(54) DRIVE SYSTEM HAVING OPERATOR-SELECTABLE CONTROL MODES

(71) Applicant: Caterpillar S.A.R.L., Geneva (CH)

(72) Inventors: Steven James Juricak, Cary, NC (US); Joshua David Callaway, Cary, NC (US); Joseph Edward Forcash, Zelienople, PA (US); Gavin David Oliver Ripley, Garner, NC (US); Ragavender Mailwar, Peoria, IL (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 14/599,405

(22) Filed: Jan. 16, 2015

(65) Prior Publication Data

US 2016/0208458 A1    Jul. 21, 2016

(51) Int. Cl.
| | |
|---|---|
| *B60W 30/18* | (2012.01) |
| *E02F 9/20* | (2006.01) |
| *B60K 6/08* | (2006.01) |
| *B60K 23/00* | (2006.01) |
| *E02F 3/34* | (2006.01) |

(52) U.S. Cl.
CPC .............. *E02F 9/2079* (2013.01); *B60K 6/08* (2013.01); *B60K 23/00* (2013.01); *E02F 3/34* (2013.01)

(58) Field of Classification Search
CPC .............. B60W 30/18018; B60W 2030/1809; B60W 30/18045
See application file for complete search history.

(56) References Cited

U.S. PATENT DOCUMENTS

| | | | |
|---|---|---|---|
| 4,941,096 A | 7/1990 | Ito et al. | |
| 5,776,031 A | 7/1998 | Minowa et al. | |
| 5,983,154 A | 11/1999 | Morisawa | |
| 6,341,488 B1 | 1/2002 | Shimizu et al. | |
| 7,614,977 B2 | 11/2009 | Fuji et al. | |
| 2011/0190993 A1 | 8/2011 | Eriksson et al. | |
| 2013/0104532 A1* | 5/2013 | Ries ................ | B60W 30/18045 60/327 |

FOREIGN PATENT DOCUMENTS

| | | |
|---|---|---|
| JP | 2006042528 A | 2/2006 |
| JP | 2009056884 A | 3/2009 |

* cited by examiner

*Primary Examiner* — Bryan Evans
(74) *Attorney, Agent, or Firm* — Finnegan, Henderson, Farabow, Garrett & Dunner, LLP

(57) ABSTRACT

A drive system for a mobile machine is disclosed. The drive system includes a power source configured to generate mechanical power, and a transmission driven by the power source, a traction device driven by the transmission. The drive system further includes a first input device configured to generate a signal to operate the machine, a second input device configured to receive an operator selection of one of a plurality of transmission modes, and a controller in communication with the first input device and the transmission. The controller is configured to adjust operation of the transmission to control a speed rate of change of the traction device in response to the signal from the first input device and based on the operator-selected one of the plurality of transmission modes.

17 Claims, 3 Drawing Sheets

DRIVE SYSTEM HAVING OPERATOR-SELECTABLE CONTROL MODES

TECHNICAL FIELD

The present disclosure relates generally to a drive system and, more particularly, to a drive system having operator-selectable control modes.

BACKGROUND

Machines such as wheeled compactors, loaders, trucks, and other mobile equipment are used to perform many tasks. To effectively perform these tasks, the machines require an engine that provides significant torque through a drive system to one or more ground engaging traction devices (e.g., wheels, tracks, etc.). Drive systems for such machines usually include either a mechanical power-shift transmission that is connected to the engine by way of a mechanical or hydraulic torque converter, or a hydrostatic transmission (hystat) that pressurizes fluid with an engine-driven pump for powering a motor connected to the traction device. Recently, more attention has been given to the use of hystats because hystats are known to achieve higher fuel efficiency and extended functionality when compared with a power-shift transmission. A hystat provides an infinitely variable torque-to-speed output ratio within its overall range through the pairing of a variable displacement pump and a fixed- or variable-displacement motor.

Although higher fuel efficiency and extended functionality can be achieved with hystats, many operators still do not prefer machines equipped with hystats because hystat systems respond to operator commands (e.g., throttle commands, directional shits, shifts to neutral, work tool commands etc.) with different characteristics (e.g., acceleration rates, deceleration rates, rimpull torque, etc.) than the familiar and comfortable characteristics of power-shift systems. For instance, when an operator releases the acceleration pedal or throttle of a machine equipped with a hystat, displacements of the pump and/or motor are immediately neutralized and the machine either continues traveling at about the same speed for an extended period of time (when both the pump and motor are neutralized) or quickly stops (when only one of the pump and motor are neutralized). Therefore, operators must modulate the acceleration lever or pedal to move through intermediate displacement positions in a gradual manner in order to travel at an increasingly slower speed. This can prove very difficult in rough terrain common to many worksites, especially for unskilled operators, and can cause undue operator fatigue.

One attempt to vary the response characteristics of a hystat drive system is described in U.S. Patent Publication No. 2013/0104532 (the '532 publication) by Ries et al. that published on May 2, 2013. The '532 publication describes a hystat drive system having a transmission input device that allows an operator to select a transmission setting for operating the machine with a desired virtual gear or range of speed-to-torque ratios. Based on the operator's selection, a controller selects a relationship from an acceleration map that corresponds with the transmission setting. The controller then uses the relationship to adjust the displacement of a pump and/or a motor in the hystat system during an acceleration process. When the operator initiates a coasting or braking operation, the controller selects a coasting deceleration map or a braking deceleration map, respectively, and adjusts the pump and/or motor displacements to slow the vehicle by a desired amount over a desired period of time after initiation of the coasting or braking operation. The desired period of time is a function of the machine's travel speed when the coasting or braking operation was initiated.

Although the system of the '532 publication may be somewhat effective at changing the acceleration rate and deceleration rate of a machine equipped with a hystat, it may not be optimal. In particular, because the speed change characteristics of the '532 publication are based on a gear selection, acceleration and deceleration characteristics of the machine may not be optimal under varying conditions. Further, the single control mode of the '532 publication may not allow the machine to be effectively controlled by operators of varying skill and/or familiarity levels.

The system of the present disclosure solves one or more of the problems set forth above and/or other problems of the prior art.

SUMMARY

In one aspect, the present disclosure is directed to a drive system for a mobile machine. The drive system includes a power source configured to generate mechanical power, and a transmission driven by the power source, a traction device driven by the transmission. The drive system further includes a first input device configured to generate a signal to operate the machine, a second input device configured to receive an operator selection of one of a plurality of transmission modes, and a controller in communication with the first input device and the transmission. The controller is configured to adjust operation of the transmission to control a speed rate of change of the traction device in response to the signal from the first input device and based on the operator-selected one of the plurality of transmission modes.

In another aspect, the present disclosure is directed to a method of controlling a mobile machine having a power source connected via a transmission to a traction device. The method includes driving the transmission with the power source, driving the traction device with the transmission, receiving an input from an operator indicative of a desired machine operation, and receiving an operator selection of one of a plurality of transmission modes. The method further includes selectively adjusting operation of the transmission to control a speed rate of change of the traction device in response to the input and based on an operator-selected one of the plurality of transmission modes.

In yet another aspect, the present disclosure is directed to a mobile machine. The machine includes a frame, one or more traction devices mounted to the frame, an engine mounted to the frame; and a transmission coupled to the engine and including a pump driven by the engine to pressurize a fluid and a motor fluidly connected to the pump and drivingly connected to the one or more traction devices. The machine further includes an operator station configured to generate signals to operate the machine. The operator station includes a throttle input device configured to affect a speed of the power source, a brake input device configured to affect a speed of the traction device, a direction input device movable to a forward position, a neutral position, and a reverse position and configured to affect a travel direction of the traction devices, and a transmission input device configured to receive an operator selection of one of a plurality of transmission modes. The machine further includes a controller in communication with the throttle input device, brake input device, direction input device, transmission input device, and the transmission, the controller being configured to adjust a displacement of at least one of the pump and motor to control a speed rate of change of the traction device in response to the signals from the operator station and based on the operator-selected one of the plurality of transmission modes.

DETAILED DESCRIPTION

Figure 1:
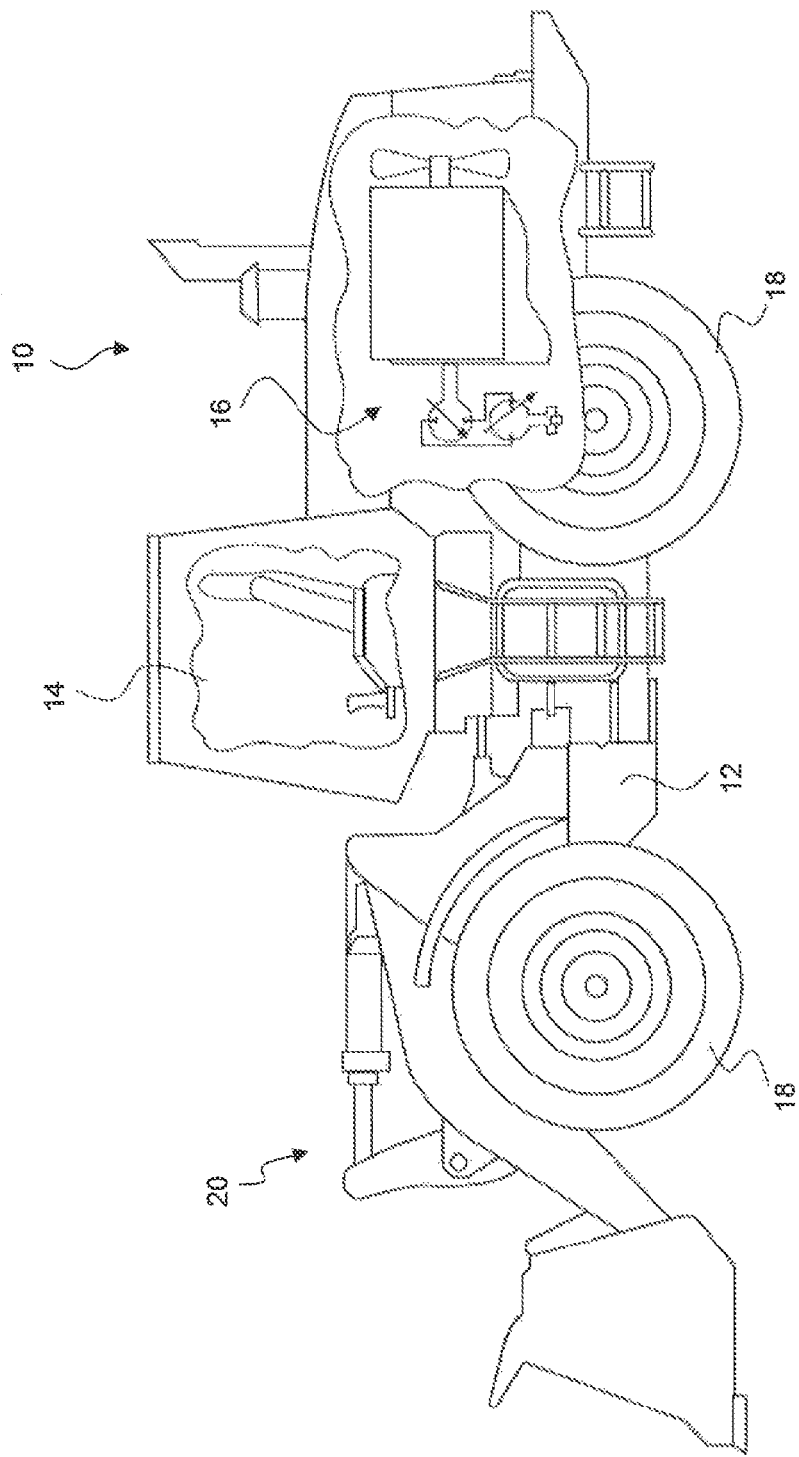
FIG. 1 is a diagrammatic illustration of an exemplary disclosed machine.

FIG. 1 illustrates an exemplary embodiment of a machine 10. Machine 10 is a mobile machine that performs some type of operation associated with an industry such as mining, construction, farming, transportation, or another industry known in the art. For example, machine 10 may be a wheel loader (shown in FIG. 1), an on- or off-highway haul truck, a motor grader, a compactor, or another type of mobile machine known in the art. Machine 10 may include a frame 12 that supports an operator station 14, from which operator control of machine 10 may be affected. Machine 10 also includes a drive system 16 supported by frame 12 of machine 10 and operatively connected to one or more driven and/or steerable traction devices 18, such as, for example, wheels, tracks, or belts located on each side of machine 10. Machine 10 further includes a tool system 20 mounted to frame 12 and operatively driven by at least a portion of drive system 16 (e.g., by power source 44 of FIG. 2) to perform various operations.

Figure 2:
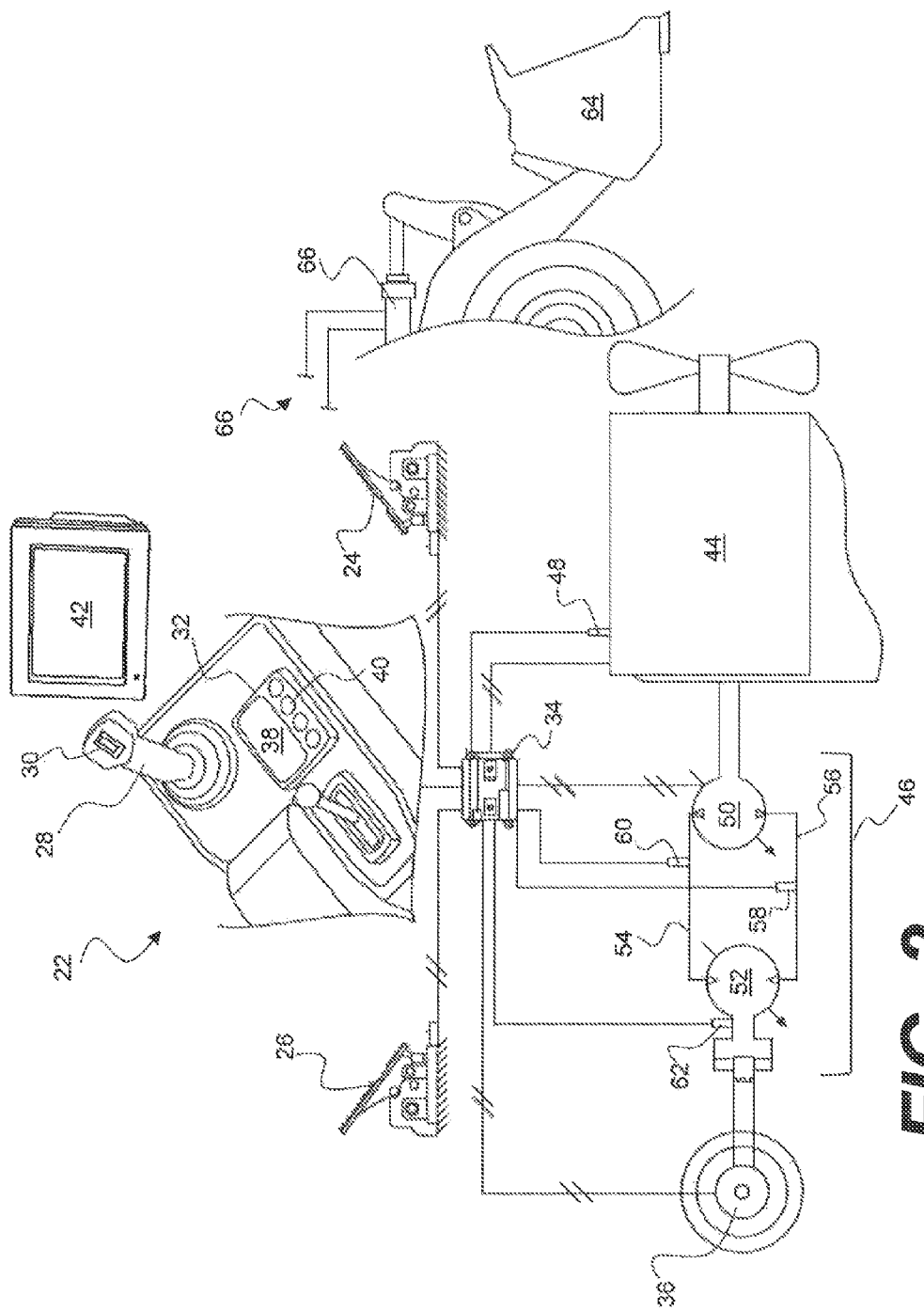
FIG. 2 is a diagrammatic illustration of an exemplary disclosed control system for use with the machine of FIG. 1.

As illustrated in FIG. 2, operator station 14 includes an operator interface 22 proximate a seat (not shown) for generating machine command signals indicative of desired machine maneuvers and/or functions for operating machine 10. In the disclosed embodiment, operator interface 22 includes a plurality of input devices including a throttle input device 24, a brake input device 26, a tool system input device 28, a direction input device 30, and a transmission input device 32. It should be noted, however, that additional input devices may be included in operator interface 22, if desired. Each input device may take the form of a joystick, a pedal, a push-button, a touch pad, a knob, a dial, a lever, a switch, or other devices. As an operator manipulates the input devices, the operator may expect and affect corresponding operations of machine 10.

Throttle input device 24 includes, for example, a first foot pedal (e.g., a right foot pedal) that is pivotable through a range from a neutral position to a maximum displaced position to generate one or more corresponding displacement signals that are indicative of desired engine speeds speeds during machine travel. Values of the displacement signal correspond with a desired amount (e.g., percent) of a maximum allowable engine speed or a range between a minimum allowable and a maximum allowable engine speed (e.g., set using a different input device) during machine travel. For instance, when throttle input device 24 is in the neutral position, the displacement signal has a minimum value, for example about zero, indicating that an engine speed of machine 10 should be increased by about 0% of a difference between a current minimum allowable engine speed and a current maximum allowable engine speed set by the operator (e.g., a selected engine speed range). Similarly, when throttle input device 24 is displaced to a point about halfway between the neutral position and the maximum displaced position, the displacement signal indicates a desired engine speed increase by about 50% of the difference between the current minimum allowable engine speed and a current maximum allowable engine speed set by the operator. It is contemplated that a function other than percentage may be utilized, if desired. The desired engine speed corresponds to a desired speed of the traction devices 18 such that throttle input device 24 is movable from the neutral position to increase the speed of traction devices 18 and releasable to reduce the desired speed of traction devices 18. The displacement signal generated by throttle input device 24 is directed to a controller 34 for further processing.

Brake input device 26 includes, for example, a second foot pedal (e.g., a left foot pedal) that is pivotable through a range from a neutral position to a maximum displaced position to generate one or more corresponding displacement signals indicative of a desire to decelerate machine 10. Values of the displacement signal through the range correspond with multiple types of braking operations for decelerating machine 10. For example, pivoting brake input device 26 through a first portion of the range (e.g., less than about 8° of rotation) generates a first braking signal communicable to controller 34 for reducing a target ground speed of drive system 16 to decelerate machine 10. The change in the target ground speed may have a linear, curvilinear, or other relationship with the displacement position of brake input device 26. Pivoting brake input device 26 through a second portion of the range (e.g., greater than about 8° of rotation) generates a second deceleration signal communicable to controller 34 for controlling a braking device 36 operatively connected to one or more traction devices 18 for decelerating machine 10. Accordingly, brake input device is movable from the neutral position to decrease the speed of traction devices 18. In this way, brake input device 26 may be releasable to increase or maintain the speed of the traction devices 18 (i.e., allowing traction devices 18 to maintain a current ground speed or accelerate to achieve a higher ground speed based on the positions of throttle input device 24 and brake input device 26).

Tool system input device 28 includes, for example, a joystick that is movable through a range from a neutral position to one or more maximum displaced positions to generate one or more corresponding displacement signals that are indicative of desired tool system maneuvers. For example, tool system input device 28 may be tilted and/or rotated in multiple directions on a plurality of axes, each axis being associated with a different type of tool system maneuver (e.g., raising and lowering a work tool, racking and dumping the work tool, etc.). Tool system input device 28 also includes one or more buttons, switches, triggers, toggles, etc., for actuating other functions of machine 10. In some embodiments, tool system input device 28 includes or is integral with throttle input device 24 and/or brake input device 26 (i.e., tool system input device 28 may be movable in various directions to respectively generate throttle input and brake input displacement signals).

Direction input device 30 includes, for example, a switch or other device that is movable to a forward position, a neutral position, and a reverse position to generate a direction signal indicative of a desired travel direction of machine 10. The direction signal may be communicable to controller 34 for controlling drive system 16 and indicates a forward direction, a neutral direction (i.e. neither forward nor reverse), or a reverse direction. For example, when direction input device 30 is moved to the forward position, drive system 16 drives traction device(s) 18 in a forward (e.g., frontward-facing). When direction input device 30 is moved to the reverse position, drive system 16 drives traction device(s) 18 in a reverse (e.g., backward or rearward-facing) direction. When direction input device 30 is moved to the neutral position, drive system 16 does not drive traction device(s) 18 in either direction, but performs a coasting operation in the current direction of travel (e.g. the forward direction or the reverse direction). In some embodiments, direction input device 30 may be integral with tool system input device 28 (as shown in FIG. 2). In other embodiments, direction input device 30 may be a lever, knob, push button, or other device, and may be independently located on operator interface 22.

Transmission input device 32 in communication with controller 34 and includes, for example, a touch pad 38 and a plurality of push buttons 40 that, when pressed by the operator of machine 10, select one or more of a plurality of available gear modes. Gear modes may include independent selections of, for example, virtual gears, ranges of virtual gears, actual gears, ranges of actual gears, portions of a continuous range of speed-to-torque ratios, etc. For example, the operator may press a first of push buttons 40 to select a first gear mode, in which drive system 16 operates within a highest torque output range and a corresponding lowest travel speed range. Likewise, the operator may press a second of push buttons 40 to select a second or higher gear mode, in which drive system 16 operates with a lower torque output range and a corresponding higher travel speed range. Further, the plurality of gear modes also includes operator-selectable rimpull limits. For example, transmission input device 32 may display a number of selectable rimpull limits, and the operator may choose any one of the available rimpull limits to achieve a desired traction characteristics between traction devices 18 and the ground surfaces (e.g., to reduce slipping between traction devices 18 and a slippery ground surface).

Additionally, transmission input device 32 separately receives an operator selection of one of a plurality of transmission modes. The plurality of transmission modes allow an operator to select certain response behaviors of drive system 16 in response to signals generated by input devices 24-30. The plurality of transmission modes also indicate to controller 34 how to control transmission unit 44 to change certain characteristics of drive system 16 to achieve the behaviors desired by the operator. In particular, each transmission mode is associated with a transmission mode profile that includes a set of maps, functions, algorithms, models, and/or data stored in controller 34 for controlling outputs of drive system 16 such as acceleration rates, deceleration rates, minimum speeds, torque-to-engine speed outputs, torque limits, power distributions, and other outputs in response to signals from operator input devices 24-30. For example, transmission input device 32 displays a menu showing a plurality of operator-selectable transmission modes that includes, for example, a default mode that corresponds to default output characteristics. Transmission input device 32 also displays at least one additional mode such as a mode for changing the output characteristics of drive system 16 to be different than the default mode such as, for example, to resemble output characteristics of other types of transmissions or specialized transmission modes. The at least one additional mode may include modes that resemble output characteristics of, for example, a power-shift transmission having a torque converter, a traditional hystat, or a transmission that is optimized for operating on slippery ground conditions. The transmission modes may be selected by an operator while machine 10 is in motion (i.e., "on the fly") by, for example, pressing a soft key on touch pad 38 or by pressing one of push buttons 40. Transmission input device generates a signal communicable to controller 34 indicative of a transmission mode selected by the operator. The transmission modes may not include an operator selection of a gear, virtual gear, range of gears or virtual gears, ranges of speed-to-torque ratios, etc., since such selections may be made via gear mode selections.

Operator station 14 is also equipped with a monitor 42 used to display parameters indicating certain aspects of machine status and/or performance for operator acknowledgment. Monitor 42 may be one of a liquid crystal display, a cathode ray tube display, a plasma display, or any other type of display. Monitor 42 communicates with controller 34 to receive and display machine settings affected by input devices 24-32, for example a current speed setting (as provided by throttle input device 24 and/or brake input device 26), a current drive direction (as provided by direction input device 30), a current transmission mode (as provided by transmission input device 32), and/or other available parameters. It is to be appreciated that monitor 42 may itself also receive operator input by way of a touch-screen, software keys, and the like, and may be integrated with other input devices, such as transmission input device 32.

Controller 34 is in communication with operator station 14, operator interface 22, and drive system 16 and configured to control operations of drive system 16 in response to signals received from the operator via interface 22. Communications between controller 34 and the other components of machine 10 are facilitated by communication links and other suitable network architecture. The communication links may include wired and/or wireless non-proprietary links, controller area networks (CAN), the Internet, an intranet, or other communication links and/or protocols known in the art. The network architecture may include, alone or in any desired combination, a telephone-based network (such as a PBX or POTS), a satellite-based network, a local area network (LAN), a wide area network (WAN), a dedicated intranet, the Internet, and/or any other suitable network architecture.

Controller 34 includes computer-readable memory, such as read-only memories (ROM), random-access memories (RAM), and/or flash memory; secondary storage device(s), such as a tape-drive and/or magnetic disk drive; a microprocessor(s) (CPU), and/or any other components for running the disclosed application. The microprocessor(s) may comprise any suitable combination of commercially-available or specially-constructed microprocessors for controlling system operations in response to operator input. Controller 34 may include machine instructions and/or data stored as hardware, software, and/or firmware within the memory, secondary storage device(s), and/or microprocessors. Various other circuits may be associated with controller 34, such as power supply circuitry, signal conditioning circuitry, solenoid driver circuitry, and other types of circuitry, if desired.

As also shown in FIG. 2, drive system 16 includes components that cooperate to generate and transmit power to propel machine 10. In particular, drive system 16 includes a power source 44 and a transmission unit 46 operatively coupled to power source 44 to receive, convert, and/or transmit power to traction devices 18, which is driven by an output of transmission unit 46 to propel machine 10.

In this embodiment, power source 44 is a combustion engine having multiple subsystems that cooperate to produce mechanical or electrical power output. For the purposes of this disclosure, power source 44 is depicted and described as a four-stroke diesel engine. However, it is to be appreciated that power source 44 may be any other type of internal combustion engine such as, for example, a gasoline or a gaseous fuel-powered engine. The subsystems included within power source 44 may include, for example, a fuel system, an air induction system, an exhaust system, a lubrication system, a cooling system, or any other appropriate system. One or more of the subsystems of power source 44 may be in communication with and controlled by controller 34.

A sensor 48 is associated with power source 44 to sense an output speed thereof. Sensor 48 may embody, for example, a magnetic pickup-type sensor in communication with a magnet embedded within a rotational component of power source 44, such as a crankshaft, flywheel, or the like. During operation of power source 44, sensor 48 detects a rotating magnetic field produced by the embedded magnet and generate a corresponding feedback signal in response. The signal has a frequency component directly proportional to the output speed of power source 44. Signals produced by sensor 48 are indicative of an actual engine speed of power source 44 and directed to controller 34 for further processing.

Transmission unit 46 may be continuously variable transmission (CVT), such as a variable-diameter pulley system, a toroidal CVT system, a magnetic CVT system, a motor/generator system, a ratcheting CVT system, a hydrostatic system, or other type of transmission. In the exemplary embodiment of FIG. 2, transmission unit embodies a hydrostatic transmission (hystat) having an infinite number of available torque-to-speed output ratios (i.e., virtual gears) within its continuous overall range. It is understood, however, that transmission unit 46 may embody any of the above mentioned or other transmission types. In the example of FIG. 2, transmission unit 46 includes a pump 50 coupled to receive the output of power source 44. Pump 50 is operatively fluidly connected to power one or more motor(s) 52 via a first passage 54 and a second passage 56. Motor 52 is driven by pressurized fluid from pump 50 to rotate traction devices 18 and propel machine 10. As will be described in more detail below, one or more operational characteristics of pump 50 and/or motor 52 are selectively regulated, limited, or otherwise controlled by controller 34 to affect desired output characteristics of drive system 16 in response to signals from input devices 24-32. In particular, a displacement of pump 50, motor 52, or both may be adjusted to achieve desired output characteristics of drive system 16. For example, the displacement of pump 50 may be adjusted while the displacement of motor 52 is fixed, the displacement of motor 52 may be adjusted while the displacement of pump 50 is fixed, or the displacements of both pump 50 and motor 52 may be adjusted, if desired.

In the present embodiment, pump 50 is a variable displacement pump and is controlled by controller 34 to draw fluid from motor 52 and discharge the fluid at a specified elevated pressure and/or rate back to motor 52 in two different directions. That is, pump 50 includes a stroke-adjusting mechanism, for example a swashplate, a position of which is hydro- or electro-mechanically adjustable to thereby vary an output (e.g., a discharge pressure or rate) of pump 50. The stroke adjusting mechanism is adjusted based on, among other things, a desired speed and/or torque of motor 52, a desired acceleration and/or deceleration rate of traction devices 18, a desired rimpull torque, a desired torque-to-engine speed relationship, or other factors. The displacement of pump 50 is adjustable from a zero displacement position at which substantially no fluid is discharged from pump 50, to a maximum displacement position in a first direction at which fluid is discharged from pump at a maximum rate into first passage 54. Likewise, the displacement of pump 50 is adjustable from the zero displacement position to a maximum displacement position in a second direction at which fluid is discharged from pump 50 at a maximum rate into second passage 56 (i.e., pump 50 may be an over-center pump). Pump 50 is drivingly connected to power source 44 of machine 10 by, for example, a countershaft, a belt, or in another suitable manner. Alternatively, pump 50 may be indirectly connected to power source 44 via a gear box, an electrical circuit, or in any other manner known in the art.

In the present embodiment motor 52 includes one or more motors 52 (only one shown in FIG. 2) driven to rotate by a fluid pressure differential generated by pump 50. Specifically, motor 52 include first and second chambers (not shown) located to either side of a pumping mechanism such as an impeller, plunger, or series of pistons (not shown). When the first chamber is filled with pressurized fluid from pump 50 via first passage 54 and the second chamber is drained of fluid returning to pump 50 via second passage 56, the pumping mechanism is urged to move or rotate in a first direction (e.g., in a forward traveling direction). Conversely, when the first chamber is drained of fluid and the second chamber is filled with pressurized fluid, the pumping mechanism is urged to move or rotate in an opposite or reverse direction (e.g., in a rearward traveling direction). The flow rate of fluid into and out of the first and second chambers determines an output velocity of motor 52, while a pressure differential across the pumping mechanism may determine an output torque.

A first pressure sensor 58 is disposed in first passage 54 and a second pressure sensor 60 is disposed in second passage 56, and pressure sensors 58, 60 are configured to generate signals indicative of pressures in first and second passages 54, 56, respectively. Signals from pressure sensors 58, 60 are used by controller 34 to determine a pressure differential across the pumping mechanism of motor 52 for determining a torque output of motor 52. Motor 52 is also be equipped with a sensor 62 for determining an output speed of motor 52. Sensor 62 is a magnetic pickup-type sensor in communication with a magnet embedded within a rotational component of motor 52, such as an output shaft. It is contemplated that a displacement of motor 52 may be variable, if desired, such that for a given flow rate and/or pressure of supplied fluid, a speed and/or torque output of motor 52 may be adjusted by controller 34.

In some embodiments, motor 52 is mechanically driven to create a pressure differential within transmission unit 46 that functions to slow machine 10 and/or recuperate energy during deceleration of machine 10. In particular, there may be times when traction devices 18 rotate at a faster speed and/or with greater torque than motor 52 would otherwise be driven by fluid from pump 50 (e.g., when machine 10 is traveling downhill). In this situation, motor 52 functions as a pump, pressurizing fluid directed back to pump 50, which functions as a motor in this situation. When motor 52 pressurizes fluid, energy imparted to motor 52 by traction devices 18 is dissipated, thereby slowing the rotation of traction devices 18. The pressurized fluid directed from motor 52 back to pump 50 reduces a load placed on power source 44 by pump 50 and, in some situations, is even used to drive power source 44.

In some applications, the use of motor 52 to slow and/or stop machine 10 is insufficient. In these applications, braking device 36 decelerates one or more traction devices 18 and thus machine 10 when commanded to do so by controller 34 (e.g., in response to a braking signal received via brake input device 26). In one embodiment, braking device 36 includes a hydraulic pressure-actuated wheel brake such as, for example, a disk brake or a drum brake that is disposed between a wheel of traction devices 18 and a corresponding final drive assembly (not shown) of machine 10. When actuated, pressurized fluid within braking device 36 is utilized to increase the rolling friction of machine 10.

As also shown in FIG. 2, tool system 20 is operatively connected to at least a portion of drive system 16, such as to power source 44. Tool system 20 may include a work tool 64 (e.g., a bucket, a fork set, a gripping tool, a cutting tool, a field implement, etc.) attached to frame 12 and driven by a hydraulic actuator 66. Tool system includes hydraulic lines 68 fluidly connected to a tool system pump (not shown) for absorbing an amount of torque from power source 44 to pressurize hydraulic fluid for powering work tool 64. Work tool 64 and/or hydraulic actuator 66 is in communication with controller 34 and configured to operate in response to signals received from tool system input device 28.

Figure 3:
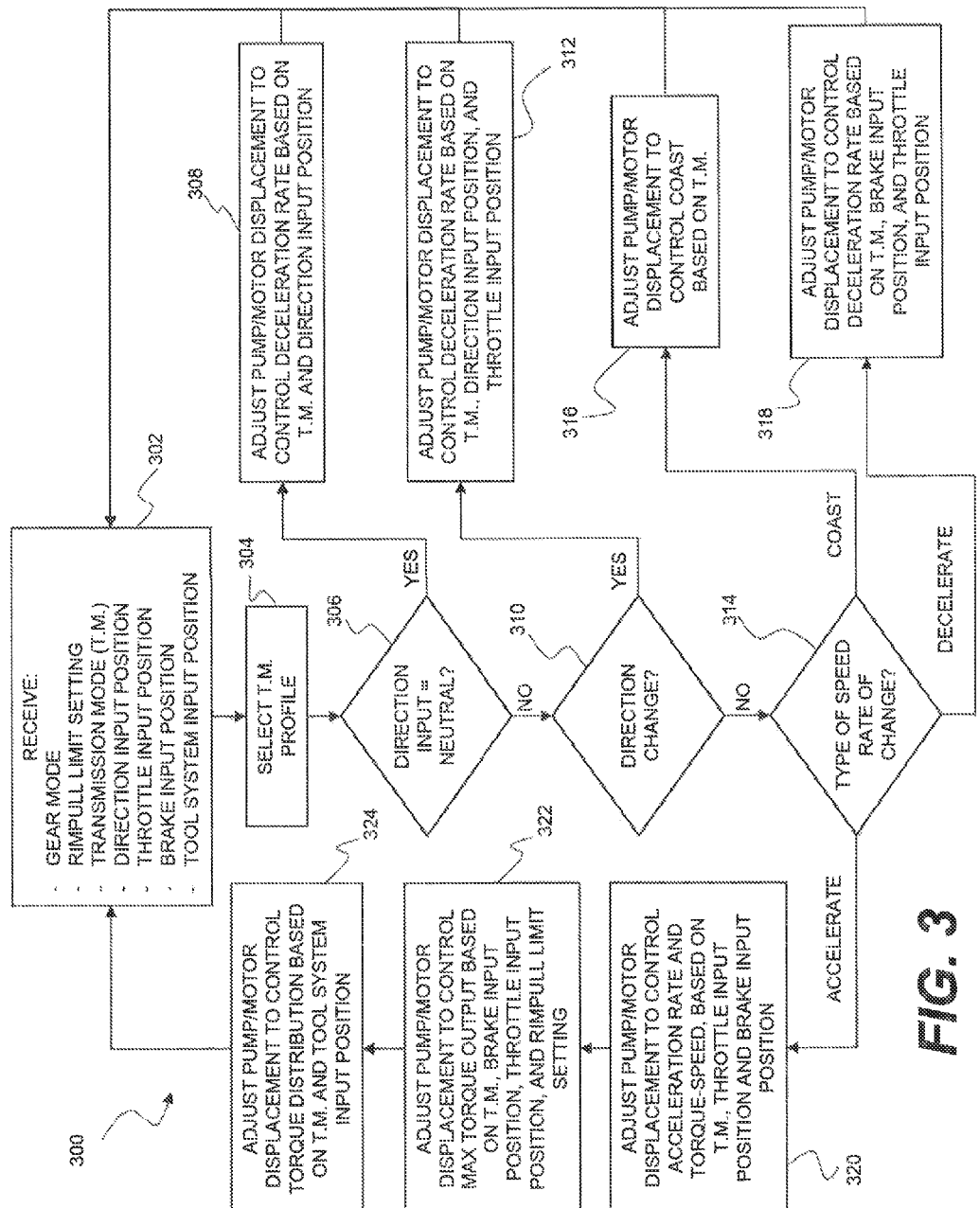
FIG. 3 is an exemplary disclosed method of operating the control system of FIG. 2.

FIG. 3 illustrates an exemplary method of controlling drive system 16 in response to signals received from operator station 14. FIG. 3 will be discussed in detail in the following section to further illustrate the disclosed concepts.

INDUSTRIAL APPLICABILITY

The disclosed drive system 16 is applicable to any mobile machine having a hystat or other type of continuously variable transmission. The disclosed drive system 16 allows the associated mobile machine to respond to operator commands in a manner similar to that previously experienced by operators of machines equipped with power-shift transmissions. Accordingly, the known efficiency benefits of a hystat or other type of transmission may be realized in any mobile machine, without sacrificing operator comfort and familiarity associated with the earlier transmission types. Operation of drive system 16 will now be described with reference to FIG. 3.

Controlling drive system 16 includes pressurizing a fluid with pump 50 driven by power source 44 (e.g., an engine), thereby providing hydraulic power. Although exemplary transmission unit 46 is described as a hystat being powered with hydraulic power, it is understood that other types of transmission may be controlled differently (e.g., by providing electric power to motors, mechanical power, etc.). The pressurized fluid is directed from pump 50 through motor 52 of transmission unit 46 to drive traction devices 18 of machine 10. When controller 34 receives a signal from the operator via a first input device (e.g., throttle input device 24, brake input device 26, direction input device 30, tool system input device 28, etc.) indicative of a machine operation, controller 34 controls the response of drive system 16 based on signals generated by the first input device.

As shown in FIG. 3, input from the operator received by controller 34 includes, among other things, a gear mode (e.g., a virtual gear, actual gear, range of speed-to-torque ratios, etc.), a rimpull limit setting, a transmission mode, a desired travel direction, a desired engine speed, desired braking, and tool system commands (Step 302). The gear mode, rimpull limit setting, and transmission mode are indicated by the operator via signals from transmission input device 32. The desired travel direction (e.g. the desired rotational direction of traction devices 18) is indicated by the operator via a signal indicating the position of direction input device 30 (e.g., forward, neutral, reverse). The desired engine speed is indicated via a signal indicating the position of throttle input device 24 as a function (e.g., a percent) of a maximum engine speed. Desired braking (e.g., desired change to the ground speed of traction devices 18) is indicated via a signal indicating the position of brake input device 26 (e.g., a degree of rotation). Tool system commands are indicated via a signal indicating the position of tool system input device 28.

After receiving signals from each of transmission input device 32, direction input device 30, throttle input device 24, brake input device 26, and tool system input device 28, controller 34 selects from memory a control mode profile from a plurality of predefined profiles (Step 304). In particular, each transmission mission mode is associated with a different control mode profile, and controller 34 is configured to select the control mode profile associated with the transmission mode selected by the operator. Each of the plurality of control mode profiles includes a set of maps, functions, algorithms, models, and/or data that define certain output parameters and may be used by controller 34 for controlling output characteristics of drive system 16. In some embodiments, the control mode profiles may be derived from empirical testing, modeling, etc., of drive systems having other or different drive system configurations. Drive systems having other or different configurations may include driving systems having another or a different type (or types) of transmission(s), and controller 34 may control drive system 16 according to such control mode profiles in order to achieve response characteristics of those other transmission types. For example, the control model profiles may be derived from data obtained from a drive system having a power-shift transmission (e.g., having a torque converter), a traditional hystat, or another type of transmission. In other embodiments, drive systems having other or different configurations may include drive systems wherein controller 34 includes a different control strategy for controlling the outputs of traction devices 18 in response to signals from input devices 24-30. A different strategy may include a strategy configured to optimize control of machine 10 under certain conditions, such as slippery ground conditions, loose ground conditions, or other ground conditions. For example, in such embodiments, the control mode profiles may be derived from empirical testing, modeling, etc., of drive systems in operation under various ground conditions (e.g., slippery ground surfaces, loose ground surfaces, etc.) and having controllers configured to optimally control the output of drive system 16 to achieve optimal outputs under such conditions. Controlled output characteristics may include speed rates of change (e.g., acceleration rates and deceleration rates, coasting rates, etc.), minimum speeds, torque-to-speed outputs, torque output limits, power distributions, rimpull limits, and other outputs in response to signals from operator input devices 24-30.

Controller 34 uses the maps, function, algorithms, models, and other data to continuously control the response characteristics of drive system 16 according to the control mode profile associated with the transmission mode selected in step 302 and based on any number of inputs. For example, controller uses as inputs the signals received in step 302 and operating parameters such as, for example, a current engine speed, a current travel speed, a current torque output of motor 52, etc. For a given set of inputs, the response characteristics of drive system 16 are determined and controlled by controller 34 based on the control mode profile associated with the transmission mode selected by the operator.

For example, a first transmission mode may include a "default" mode, whereby the response characteristics of drive system 16 are controlled in response to operator input devices 24-30 with a set of default characteristics. A second transmission mode may include a "torque converter" mode, whereby controller 34 adjusts operation of transmission unit 46 according to a control mode profile obtained from and characterizing the behavior of a transmission having a torque converter in response to inputs from the operator. In particular, when "torque converter" mode is selected, controller 34 adjusts the displacement of pump 50 and/or motor 52 to control the response characteristics of drive system 16 in response to operator input devices 24-30 according to the associated control mode profile so drive system 16 behaves like the transmission (having a torque converter) from which the control mode profile was derived. Accordingly, drive system 16 responds to the operator's commands with the comfortable and familiar characteristics of a power-shift system having a torque converter when "torque converter" mode is selected.

A third transmission mode may be a "hystat" mode, whereby controller 34 adjusts operation of transmission unit 46 according to a control mode profile obtained from and characterizing the behavior of a traditional hystat in response to inputs from the operator. In particular, when "hystat" mode is selected, controller 34 adjusts the displacement of pump 50 and/or motor 52 to control the response characteristics of drive system 16 in response to operator input devices 24-30 according to the associated control mode profile so drive system 16 behaves like the traditional hystat transmission from which the control mode profile was derived. Accordingly, drive system 16 responds to the operator's commands with the familiar characteristics of a traditional hystat system when "hystat" mode is selected A fourth transmission mode may be an "ice" mode, whereby controller 34 adjusts operation of transmission unit 46 according to a control mode profile obtained from and characterizing the behavior of a drive system tuned to optimally respond to operator inputs for maintaining control of machine 10 under slippery ground conditions. In particular, when "ice" mode is selected, controller 34 adjusts the displacement of pump 50 and/or motor 52 to control the response characteristics of drive system 16 in response to operator input devices 24-30 according to the associated control mode profile so drive system 16 behaves like the drive system tuned to respond optimally under slippery ground conditions from which the control mode profile was derived. Accordingly, drive system 16 responds to the operator's commands in a way that provides optimum control under slippery ground conditions when "ice" mode is selected.

The maps, functions, algorithms, models, and/or data associated with each transmission mode may be generated from empirical data and/or modeling techniques. Differences in the response characteristics among the plurality of transmission modes and with respect to the each other may be described in general relative terms, but are ultimately defined by the plurality of respective characteristic maps, models, functions, and other data associated with each mode that indicate output characteristics corresponding to numerous combinations of current operating parameters. It is contemplated that any number of transmission modes and associated control mode profiles derived by any empirical, modeling, or other method may be stored within controller 34 and used to control drive system 16. For the purpose of this disclosure, the remaining steps of process 300 will be explained with reference to the exemplary "default," "torque converter," "hystat," and "ice" modes.

After controller 34 selects a control mode profile associated with the transmission mode selected by the operator at step 304, controller 34 then continuously controls operation of transmission unit 46 to achieve output characteristics of drive system 16 in response to operator input devices 24-30 received at step 302 and based on the selected control mode profile. For example, controller 34 determines whether direction input device 30 has been moved to a neutral position based on the signal generated by direction input device 30 (Step 306). A shift to neutral may indicate the operator's intention to perform a coasting operation with machine 10.

When the determination at step 306 is "yes," that is, when the signal generated by direction input device 30 indicates the neutral position, controller 34 continuously adjusts a displacement of pump 50 and/or motor 52 to control the deceleration rate of traction devices 18 according to the transmission mode selected by the operator in step 302 (Step 308). In particular, controller 34 continuously adjusts the displacement of pump 50 and/or motor 52 so the actual deceleration rate of traction devices 18, as determined with sensor 62 or by any other method, follows a deceleration rate, curve, map, or other data within the control mode profile associated with the selected transmission mode. For example, in "default" mode, controller 34 controls the deceleration rate of traction devices 18 at step 308 according to a linear and/or curvilinear deceleration rate, or according to a default deceleration map, model. It should be noted that, although steps 306-326 are shown and described as occurring in a particular order, it is contemplated that these steps may be completed in a different order or completed simultaneously, if desired.

In "torque converter" mode, controller 34 adjusts operation of transmission unit 46 to change the deceleration rate of traction devices 18 at step 308 according to a deceleration rate, map, model, or other data included with the control mode profile associated with "torque converter" mode. For example, the deceleration rate, map, model, or other data may be derived from a machine equipped with a power-shift transmission (e.g., having a torque converter) during a coasting operation in neutral. Accordingly, controller 34 controls the deceleration rate of traction devices 18 with the behavior of a power-shift transmission (e.g., having a torque converter) when "torque converter" mode is selected and direction input device 30 is shifted to the neutral position. In some embodiments, when "torque converter" mode is selected, controller 34 may adjust the operation of transmission unit 46 at step 308 so traction devices 18 decelerate at a decreased, or "less aggressive," rate than when "default" mode is selected.

In "hystat" mode, controller 34 adjusts operation of transmission unit 46 to change the deceleration rate of traction devices 18 at step 308 according to a deceleration rate, map, model, or other data included with the control mode profile associated with "hystat" mode. For example, the deceleration rate, map, model, or other data may be derived from a machine equipped with a traditional hystat during a coasting operation in neutral. Accordingly, controller 34 controls the deceleration rate of traction devices 18 with the behavior of a traditional hystat when "hystat" mode is selected and direction input device 30 is shifted to the neutral position. In some embodiments, when "hystat" mode is selected, controller 34 may adjust the operation of transmission unit 46 at step 308 so traction devices 18 decelerate at an increased, or "more aggressive," rate than when "default" mode or "torque converter" mode is selected.

In "ice" mode, controller 34 adjusts operation of transmission unit 46 to change the deceleration rate of traction devices 18 at step 308 according to a deceleration rate, map, model, or other data included with the control mode profile associated with "ice" mode. The deceleration rate, map, model, or other data may be derived from a machine equipped with a drive system tuned to optimally respond to operator inputs for maintain control of machine 10 under slippery ground conditions during a coasting operation in neutral. For example, traction devices 18 may break traction with a slippery ground surface and cause the operator to lose control of machine 10 when direction input device 30 is shifted to the neutral position and traction devices begin to decelerate. Accordingly, controller 34 controls operation of transmission unit 46 to reduce the deceleration rate of traction devices 18, thereby reducing rimpull torque and extending the coasting distance of machine 10 when "ice" mode is selected and direction input device 30 is shifted to the neutral position. In some embodiments, when "ice" mode is selected, controller 34 may adjust the operation of transmission unit 46 at step 308 so traction devices 18 decelerate at a decreased, or "less aggressive," rate than when any of the other modes are selected, thereby reducing the likelihood that traction devices 18 will break traction with the ground surface. When deceleration has stopped or when the operator generates a new command, controller may return to step 302.

When the determination at step 306 is "no," controller 34 then determines if the operator has commanded machine 10 to change directions based on the position of direction input device 30 (Step 310). For example, moving direction input device 30 from the forward position, through the neutral position, and to the reverse position or vice versa without first bringing machine 10 to a complete stop may indicate the operator's intention to quickly slow machine 10 and change directions using a coasting operation and throttle input device 24. Particularly, when the signal generated by direction input device 30 is opposite a current direction of travel, the operator may desire to change the travel direction of machine 10.

When the determination at step 310 is "yes," that is, when the signal generated by direction input device 30 indicates a position opposite a current travel direction, controller 34 continuously adjusts a displacement of pump 50 and/or motor 52 to control the deceleration rate of traction devices 18 based on the transmission mode selected by the operator in step 302 and based on the position of throttle input device 24 (Step 312). That is, in response to a directional shift at step 312, controller 34 continuously adjusts a displacement of pump 50 and/or motor 52 so the actual deceleration rate of machine 10 follows a default deceleration rate, map, model, or other data set associated with the transmission mode selected by the operator and reflects the operator's intention to selectively increase the deceleration rate by moving throttle input device 24. For example, in "default" mode, controller 34 may control the deceleration rate of traction devices 18 at step 312 according to a linear or curvilinear rate based the position of throttle input device 24.

In "torque converter" mode and "hystat" mode, controller 34, for example, controls the deceleration rate of traction devices 18 at step 312 according to a deceleration rate, map, model, or other data included with the control mode profile associated with "torque converter" mode or "hystat" mode, respectively. For example, in "torque converter" mode, the deceleration rate, map, model, or other data may be derived from a machine equipped with a power-shift transmission (e.g., having a torque converter) during a directional shift. Alternatively, in "hystat" mode, the deceleration rate, map, model, or other data may be derived from a machine equipped with a traditional hystat during a directional shift. Accordingly, controller 34 controls the deceleration rate of traction devices 18 with the behavior of a power-shift transmission when in "torque converter" mode or a traditional hystat when "hystat" mode is selected and direction input device 30 is shifted from the forward or reverse position, through the neutral position, to the opposite position. In some embodiments, when "torque converter" or "hystat" mode is selected, controller 34 may adjust the operation of transmission unit 46 at step 312 so traction devices 18 decelerate at similar rate as "default" mode.

In "ice" mode, controller 34 adjusts operation of transmission unit 46 to change the deceleration rate of traction devices 18 at step 312 according to a deceleration rate, map, model, or other data included with the control mode profile associated with "ice" mode. The deceleration rate, map, model, or other data may be derived from a machine equipped with a drive system tuned to optimally respond to operator inputs for maintain control of machine 10 under slippery ground conditions during a directional shift operation. For example, traction devices 18 may break traction with a slippery ground surface and cause the operator to lose control of machine 10 when direction input device 30 is shifted from the forward or reverse position, through the neutral position, to the opposite position, and traction devices begin to decelerate. When the operator displaces throttle input device 24 during this operation, more torque may be input to traction devices 18, which may increase the possibility of slippage. Accordingly, controller 34 controls operation of transmission unit 46 to reduce the deceleration rate of traction devices 18, thereby reducing rimpull torque and extending the slowing distance of machine 10 when "ice" mode is selected and direction input device 30 is shifted from one direction to the opposite direction. In some embodiments, when "ice" mode is selected, controller 34 may adjust the operation of transmission unit 46 at step 312 so traction devices 18 decelerate at a decreased, or "less aggressive," rate than when any of the other modes are selected, thereby reducing the likelihood that traction devices 18 will break traction with the ground surface. When deceleration has stopped or when the operator generates a new command, controller may return to step 302.

When the determination at step 310 is "no," that is, when direction input device is not in the neutral position and a direction change operation has not been initiated, controller 34 may determine the type of speed rate of change associated with the current operation of machine 10 (Step 314). For example, when throttle input device 24 and brake input device 26 are both in the neutral position, the type of speed rate of change may be due to a coasting operation. When the operator displaces throttle input device 24 and/or brake input device 26, controller may first determine the net change in desired ground speed by comparing the displacements of throttle input device 24 and brake input device 26 (e.g., subtracting the displacement of one from the other, or subtracting a determined speed change in response to one from the other). When the net change in desired ground speed is negative, the speed rate of change may be due to a deceleration operation. When the net change in desired ground speed is positive, the speed rate of change may be due to an acceleration operation.

When controller 34 determines the speed rate of change is due to a coasting operation at step 314, that is, when the signals from throttle input device 24 and from brake input device 26 indicate they are in the respective neutral position, controller 34 continuously adjusts a displacement of pump 50 and/or motor 52 to control the deceleration rate or acceleration rate of traction devices 18 based on the transmission mode selected by the operator in step 302 (Step 316). For example, when machine 10 is traveling on level ground or on an incline, controller 34 may control the deceleration rate of traction devices 18 according to the control mode profile associated with the selected transmission mode. When machine 10 is traveling on a decline, controller 34 may control an acceleration rate of traction devices 18 according to the control mode profile associated with the selected transmission mode. That is, controller 34 continuously adjusts the displacement of pump 50 and/or motor 52 so the actual acceleration rate or deceleration rate of traction devices 18 follows a map, model, or other data set associated with the selected transmission mode. For example, in "default" mode, controller 34 controls the acceleration or deceleration rate of traction devices 18 at step 316 according to a default map, model, or data set. When the speed of traction devices 18, as determined with sensor 62 or by any other method, has been reduced to or below a minimum speed, controller 34 controls traction devices 18 to move at a minimum speed associated with the selected transmission mode.

In "torque converter" mode, controller 34, for example controls the deceleration rate of traction devices 18 at step 316 according to a deceleration rate, map, model, or other data included with the control mode profile associated with "torque converter" mode. For example, the deceleration rate, map, model, or other data may be derived from a machine equipped with a power-shift transmission (e.g., having a torque converter) during a coasting operation. Accordingly, controller 34 controls the deceleration rate of traction devices 18 with the behavior of a power-shift transmission (e.g., having a torque converter) when "torque converter" mode is selected and throttle input device 24 and brake input device 26 are in their respective neutral positions. In some situations, such as when machine 10 travels on a flat surface, controller 34 may control traction devices to decelerate at a less aggressive rate to a minimum speed and then maintain that minimum speed, similarly as machine with a torque converter would (e.g., according to a map, model, or other data set derived from a machine having a torque converter). When, for example, machine 10 coasts on a downhill incline, controller 34 may control traction device 18 to accelerate in the way a machine equipped with a power-shift transmission would accelerate while traveling down an incline. Acceleration in this case may be controlled by controller 34 according to the control mode profile associated with "torque converter" mode. When, for example, machine 10 travel on an incline or encounters a physical load, controller 34 may be configured to slow traction devices 18 more quickly and bring them to a stop (e.g., stalling), similarly as a machine with a torque converter would. Whenever the speed of traction devise 18 has been reduced to or below a minimum speed, controller 34 controls the speed of traction devices 18 at step 316 according to a minimum speed, such as any time traction device 10 are brought to or below the minimum speed (e.g., during low idle or after being brought to a stop). The minimum speed may be a set speed or a speed dependent upon other factors and determined by controller 34 according to the control mode profile associated with the selected transmission mode. A set speed may be a speed, for example, between 0 km/h and 5 km/h (e.g., 1 km/h).

In "hystat" mode, controller 34, for example controls the deceleration rate of traction devices 18 at step 316 according to a deceleration rate, map, model, or other data included with the control mode profile associated with "hystat" mode. For example, the deceleration rate, map, model, or other data may be derived from a machine equipped with a hystat transmission during a coasting operation. Accordingly, controller 34 controls the deceleration rate of traction devices 18 with the behavior of a hystat transmission when "hystat" mode is selected and throttle input device 24 and brake input device 26 are in their respective neutral positions. In some situations, controller 34 may control traction devices to decelerate aggressively and come to a stop when throttle input device 24 and brake input device 26 are in the neutral positions, just as a machine with a traditional hystat would (e.g., according to a map, model, or other data set derived from a machine having a hystat). For example, even when machine 10 travels on an incline or a decline, controller 34 may aggressively decelerate traction devices to a stop during a coasting operation. Whenever the speed of traction devise 18 has been reduced to or below a minimum speed (e.g., a zero speed), controller 34 controls traction devices 18 to remain at the minimum speed, such as at a stop, until throttle input device 24 is displaced again.

In "ice" mode, controller 34 adjusts operation of transmission unit 46 to change the deceleration rate of traction devices 18 at step 316 according to a deceleration rate, map, model, or other data included with the control mode profile associated with "ice" mode. The deceleration rate, map, model, or other data may be derived from a machine equipped with a drive system tuned to optimally respond to operator inputs for maintain control of machine 10 under slippery ground conditions during a coasting operation. For example, traction devices 18 may break traction with a slippery ground surface and cause the operator to lose control of machine 10 when throttle input device 24 and brake input device 26 are moved to their respective neutral positions, and traction devices 18 begin to decelerate. Accordingly, controller 34 controls operation of transmission unit 46 to reduce the deceleration rate of traction devices 18, thereby reducing rimpull torque and extending the coasting distance of machine 10 when "ice" mode is selected. In some embodiments, when "ice" mode is selected, controller 34 may adjust the operation of transmission unit 46 at step 316 so traction devices 18 decelerate at a decreased, or "less aggressive," rate than when any of the other modes are selected, thereby reducing the likelihood that traction devices 18 will break traction with the ground surface. When deceleration has stopped or when the operator generates a new command, controller may return to step 302.

When controller 34 determines the speed rate of change is due to a deceleration operation at step 314, that is, when the signals from throttle input device 24 and from brake input device 26 indicate a net negative speed rate of change, controller 34 continuously adjusts a displacement of pump 50 and/or motor 52 to control the deceleration rate of traction devices 18 based on the transmission mode selected by the operator in step 302 (Step 318). That is, controller 34 continuously adjusts the displacement of pump 50 and/or motor 52 so the actual deceleration rate of traction devices 18 follows a map, model, or other data set associated with the selected transmission mode. For example, in "default" mode, controller 34 controls the acceleration or deceleration rate of traction devices 18 at step 318 according to a default map, model, or data set.

In "torque converter" mode, controller 34, for example controls the deceleration rate of traction devices 18 at step 318 according to a deceleration rate, map, model, or other data included with the control mode profile associated with "torque converter" mode. For example, the deceleration rate, map, model, or other data may be derived from a machine equipped with a power-shift transmission (e.g., having a torque converter) during a deceleration operation with brake input device 26 displaced. Accordingly, controller 34 controls the deceleration rate of traction devices 18 with the behavior of a power-shift transmission (e.g., having a torque converter) when "torque converter" mode is selected and brake input device 26 and/or throttle input device 24 are displaced. In some situations, the operator may displace brake input device 26 with throttle input device 24 in the neutral position in order to indicate a desired change to the ground speed of traction devices 18. In other situation, the operator may displace brake input device 26 to reduce the ground speed of traction devices 18 while also maintaining some displacement of throttle input device 24 to more quickly return to an increased ground speed upon release of brake input device 26. Accordingly, controller 34 determines the displacement of both brake input device 26 and throttle input device 24 and uses the displacement differential to control the deceleration rate of traction devices 18 according to the control mode profile associated with "torque converter" mode (e.g., according to a map, model, or other data set derived from a machine having a torque converter).

In "hystat" mode, controller 34, for example controls the deceleration rate of traction devices 18 at step 318 according to a deceleration rate, map, model, or other data included with the control mode profile associated with "hystat" mode. For example, the deceleration rate, map, model, or other data may be derived from a machine equipped with a hystat transmission during a deceleration operation with brake input device 26 displaced. Accordingly, controller 34 controls the deceleration rate of traction devices 18 with the behavior of a hystat when "hystat" mode is selected and brake input device 26 is displaced. In some situations, the operator may displace brake input device 26 in order to decelerate traction device 18 even more aggressively than during a coasting operation. Accordingly, controller 34 determines the displacement of brake input device 26 and uses the displacement control the deceleration rate of traction devices 18 according to the control mode profile associated with "hystat" mode (e.g., according to a map, model, or other data set derived from a machine having a hystat).

In "ice" mode, controller 34 adjusts operation of transmission unit 46 to change the deceleration rate of traction devices 18 at step 318 according to a deceleration rate, map, model, or other data included with the control mode profile associated with "ice" mode. The deceleration rate, map, model, or other data may be derived from a machine equipped with a drive system tuned to optimally respond to operator inputs for maintain control of machine 10 under slippery ground conditions during a deceleration operation with brake input device 26 displaced. For example, overapplying brake input device 26 may result in breaking traction between traction devices 18 and the ground surface, and traction devices 18 may become "locked up," resulting in a loss of steering control. Accordingly, controller 34 controls operation of transmission unit 46 to reduce the deceleration rate of traction devices 18, thereby reducing rimpull torque and extending the slowing distance of machine 10 when "ice" mode is selected. In some embodiments, when "ice" mode is selected, controller 34 may adjust the operation of transmission unit 46 at step 318 so traction devices 18 decelerate at a decreased, or "less aggressive," rate than when any of the other modes are selected, thereby reducing the likelihood that traction devices 18 will break traction with the ground surface. When deceleration has stopped or when the operator generates a new command, controller may return to step 302.

When controller 34 determines the speed rate of change is due to an acceleration operation at step 314, that is, when the signals from throttle input device 24 and from brake input device 26 indicate a net positive speed rate of change, controller 34 continuously adjusts a displacement of pump 50 and/or motor 52 to control the acceleration rate of traction devices 18 based on the transmission mode selected by the operator in step 302 (Step 320). That is, controller 34 continuously adjusts the displacement of pump 50 and/or motor 52 so the actual acceleration rate of traction devices 18 follows a map, model, or other data set associated with the selected transmission mode. For example, in "default" mode, controller 34 controls the acceleration rate of traction devices 18 at step 318 according to a default map, model, or data set.

In "torque converter" mode, controller 34, for example controls the acceleration rate of traction devices 18 at step 320 according to an acceleration rate, map, model, or other data included with the control mode profile associated with "torque converter" mode. For example, the acceleration rate, map, model, or other data may be derived from a machine equipped with a power-shift transmission (e.g., having a torque converter) during an acceleration operation with throttle input device 24 and/or brake input device 26 displaced. Accordingly, controller 34 controls the acceleration rate of traction devices 18 with the behavior of a power-shift transmission (e.g., having a torque converter) when "torque converter" mode is selected and throttle input device 24 and/or brake input device 26 are displaced. In some situations, the operator may displace throttle input device 24 with brake input device 26 in the neutral position. In other situation, the operator may displace brake input device 26 to reduce the acceleration rate of traction devices 18 while also maintaining displacement of throttle input device 24 in order to maintain the desired engine speed. In order to make such an operation feel like the operator is continuing to drive through the application of brake input device 26, controller 34 determines the displacement of both brake input device 26 and throttle input device 24 and uses the displacement differential to control the acceleration rate of traction devices 18 according to the control mode profile associated with "torque converter" mode (e.g., according to a map, model, or other data set derived from a machine having a torque converter). In this way, machine 10 behaves with acceleration and combined acceleration-braking characteristics of a machine equipped with a torque converter.

In "hystat" mode, controller 34, for example controls the acceleration rate of traction devices 18 at step 320 according to an acceleration rate, map, model, or other data included with the control mode profile associated with "hystat" mode. For example, the acceleration rate, map, model, or other data may be derived from a machine equipped with a hystat transmission during an acceleration operation with throttle input device 24 displaced. Accordingly, controller 34 controls the acceleration rate of traction devices 18 with the behavior of a hystat when "hystat" mode is selected and throttle input device 24 is displaced. Accordingly, controller 34 determines the displacement of throttle input device 24 and uses the displacement control the acceleration rate of traction devices 18 according to the control mode profile associated with "hystat" mode (e.g., according to a map, model, or other data set derived from a machine having a hystat).

In "ice" mode, controller 34 adjusts operation of transmission unit 46 to change the acceleration rate of traction devices 18 at step 320 according to an acceleration rate, map, model, or other data included with the control mode profile associated with "ice" mode. The acceleration rate, map, model, or other data may be derived from a machine equipped with a drive system tuned to optimally respond to operator inputs for maintain control of machine 10 under slippery ground conditions during an acceleration operation with throttle input device 24 displaced. For example, applying throttle input device 24 may result in additional torque being applied to traction devices 18, thereby breaking traction between traction devices 18 and the ground surface. Further, traction devices 18 may begin rotating with a tangential velocity that is greater than the actual travel speed of machine 10, resulting in a loss of steering control. Accordingly, controller 34 controls operation of transmission unit 46 to reduce the acceleration rate of traction devices 18, thereby reducing rimpull torque and increasing the distance needed to accelerate machine 10 when "ice" mode is selected. When deceleration has stopped or when the operator generates a new command, controller may return to step 302.

Depending on a desired operation, terrain, or skill level of the operator, control of machine 10 is improved by controlling a maximum rimpull limit to, for example, prevent breaking traction between traction devices 18 and the ground surface. Thus, controller 34 continuously adjusts the displacement of pump 50 and/or motor 52 to maintain the torque output of traction devices 18 to be within the rimpull limit selected by the operator in step 302 (Step 324). In particular, controller 34 receives signals from pressure sensors 58 and 60 and determines a pressure differential across the pumping mechanism of motor 52. Based on the pressure differential across the pumping mechanism of motor 52, controller 34 determines a torque output of motor 52 and continuously adjusts the displacement of pump 50 and/or motor 52 to prevent rimpull from exceeding a limit selected by the operator. Controller 34 may include other inputs to control the output torque of traction devices 18, such as the position of throttle input device 24 (i.e., the desired engine speed), the position of brake input device 26, current ground speed, etc.

For example, during each of the "default," "torque converter," and "hystat" modes, a plurality of rimpull limit settings may be selectable by the operator via transmission input device 32 (e.g., selectable during a gear mode selection) for limiting rimpull torque. In making gear mode selections, the operator may consider the desired operations to be made and the ground condition, and may select any one of the available rimpull settings for controlling the behavior of drive system. However, in "ice" mode, controller 34 limits a number of rimpull settings available for selection by the operator (e.g., the lowest few). For example, during "ice" mode, controller 34 may deny the operator access to higher rimpull limit settings, but grant the operator access to lower rimpull limit settings. In this way, controller 34 is configured to reduce the likelihood that traction devices 18 will break traction with the ground during operation of machine 10 under slippery ground conditions.

Control of drive system 16 is also affected by use of tool system 20, for example, when the operator moves tool system input device 28 while driving machine 10. In particular, the available torque that can be absorbed from the output of power source 44 is distributed between drive system 16 and tool system 20 according to a power distribution algorithm stored in controller 34. Machines that employ power-shift transmissions having torque converters are typically controlled with a power distribution that favors the tool system such that engine speed is decreased when the tool system is operated. The decrease in engine speed reduces a torque input to the drive system, and thus, reduces the torque output of the drive system, which reduces the jerky behavior typically associated with speed and directional changes. Many operators have become familiar with this type of behavior and have grown accustomed it.

To achieve this behavior with another type of CVT, such as drive system 16, controller 34 alters the power distribution algorithm stored within controller 34 to favor tool system 20 based on a tool system command generated by the operator as indicated by the position of tool system input device 28 (Step 326). In particular, controller 34 continuously adjusts the displacement of pump 50 and/or motor 52 based on a distribution algorithm associated with the transmission mode selected by the operator and based on the signal from tool system input device 28. For example, in "torque converter" mode, controller 34 controls the power distribution between drive system 16 and tool system 20 to favor tool system 20. In "default," "hystat," and "ice" modes, controller 34 controls the power distribution according to a distribution algorithm associated with the respective transmission mode to favor drive system 16. In other control modes, controller 34 evenly distributes power between drive system 16 and tool system 20, if desired.

As discussed, the disclosed drive system 16 allows an operator of machine 10 to change the response characteristics of drive system 16 equipped with transmission unit 46 (e.g., a hystat or other continuously variable transmission), in response to various operator commands, and is an improvement over known drive systems. Particularly, drive system 16 allows an operator to select one of a plurality of transmission modes for changing, among other things, speed rates of change (e.g., acceleration rates and deceleration rates) of traction devices 18 to mimic the rates of machines equipped with power-shift, hystat, or other types of transmissions. In this way, speed rates of change of traction devices 18 may be optimally controlled under varying conditions. Further, drive system 16 also allows the operator to select a transmission mode separately from a gear mode, thereby allowing operators of varying skill and familiarity levels to effectively control machine 10.

It will be apparent to those skilled in the art that various modifications and variations can be made to the disclosed drive system. Other embodiments will be apparent to those skilled in the art from consideration of the specification and practice of the disclosed drive system. It is intended that the specification and examples be considered as exemplary only, with a true scope being indicated by the following claims and their equivalents.

What is claimed is:
1. A drive system for a mobile machine, comprising:
a power source configured to generate mechanical power;
a transmission driven by the power source
a traction device driven by the transmission;
a first input device configured to generate a signal to operate the machine;

a second input device configured to receive an operator selection of one of a plurality of transmission modes; and a controller in communication with the first input device and the transmission, the controller being configured to adjust operation of the transmission to control a speed rate of change of the traction device in response to the signal from the first input device and based on the operator-selected one of the plurality of transmission modes, wherein the machine includes a tool system operatively driven by the power source;

the first input device includes a tool system input device movable through a range from a neutral position to a maximum displaced position; and the controller is further configured to adjust an output torque of the transmission according to an operator-selected one of the plurality of transmission modes and based on a position of the tool system input device.

2. The drive system of claim 1, wherein:
the first input device is a throttle input device configured to affect a speed of the power source; and
the speed rate of change is an acceleration rate.

3. The drive system of claim 1, wherein:
the first input device is a brake input device configured to affect a speed of the traction device; and
the speed rate of change is an acceleration rate or a deceleration rate.

4. The drive system of claim 1, wherein:
the first input device is a direction input device movable to a forward position, a neutral position, and a reverse position, and configured to affect a travel direction of the traction device; and
the speed rate of change is a deceleration rate when the direction input device is moved to the neutral position.

5. The drive system of claim 1, wherein:
the first input device is a direction input device movable to a forward position, a neutral position, and a reverse position, and configured to affect a travel direction of the traction device;
the drive system further includes a third input device configured to generate a signal to operate the machine, wherein the third input device is a throttle input device configured to affect a speed of the power source; and
the controller is configured to adjust operation of the transmission to control a deceleration rate of the traction device in response to the signals from the first input device and the third input device and based on the operator-selected one of the plurality of transmission modes.

6. The drive system of claim 1, wherein:
the transmission is a hystat including at least one pump and at least one motor; and
the controller is configured to adjust operation of the transmission to control the speed rate of change of the traction device by adjusting a displacement of at least one of the at least one pump and the at least one motor.

7. The drive system of claim 1, wherein:
each of the plurality of transmission modes is associated with a different one of a plurality of control mode profiles, each of the plurality of control mode profiles being derived from a different drive system configuration.

8. The drive system of claim 7, wherein the different drive system configuration includes one of a drive system having a different type of transmission or a drive system wherein the controller includes a different control strategy for controlling a speed rate of change of the traction device in response to the signal from the first input device.

9. The drive system of claim 1, wherein the controller is configured to limit a number of rimpull limit settings available for selection by an operator based on an operator-selected one of the plurality of transmission modes.

10. A method of controlling a mobile machine having a power source connected via a transmission to a traction device, comprising:
driving the transmission with the power source;
driving the traction device with the transmission;
receiving an input from an operator indicative of a desired machine operation;
receiving an operator selection of one of a plurality of transmission modes; and
selectively adjusting operation of the transmission to control a speed rate of change of the traction device in response to the input and based on an operator-selected one of the plurality of transmission modes,
wherein the machine includes a tool system operatively driven by the power source;
the input includes a tool system command; and
the method further including adjusting an output torque of the transmission according to an operator-selected one of the plurality of transmission modes and based on the tool system command.

11. The method of claim 10, wherein:
the input from the operator includes a desired speed of the power source; and
the speed rate of change is an acceleration rate.

12. The method of claim 10, wherein:
the input from the operator includes a desired change to a ground speed of traction device; and
the speed rate of change is a deceleration rate or an acceleration rate.

13. The method of claim 11, wherein:
the input from the operator includes a desired travel direction of the traction device; and
the speed rate of change is a deceleration rate when the desired travel direction is a neutral direction.

14. The method of claim 10, wherein:
the input from the operator includes a desired travel direction of the traction device and a desired speed of the power source;
the method further includes adjusting operation of the transmission to control a deceleration rate of the traction device in response to the input and based on the operator-selected one of the plurality of transmission modes.

15. The method of claim 10, wherein:
the transmission is a hystat including a pump and at least one motor; and
the method further includes adjusting operation of the transmission to control the speed rate of change of the traction device includes adjusting a displacement of one or more of the pump and the at least one motor.

16. The method of claim 10, wherein:
each of the plurality of transmission modes is associated with a different one of a plurality of control mode profiles, each of the plurality of control mode profiles being derived from a different drive system configuration.

17. The method of claim 10, further including limiting a number of rimpull limit settings available for selection by the operator based on an operator-selected one of the plurality of transmission modes.

* * * * *